May 15, 1928.

H. STREETER 1,669,918

EVAPORATING UNIT FOR REFRIGERATING SYSTEMS

Filed Aug. 21, 1924    2 Sheets-Sheet 1

INVENTOR.
Howard Streeter
BY
Stuart C Barnes
ATTORNEY.

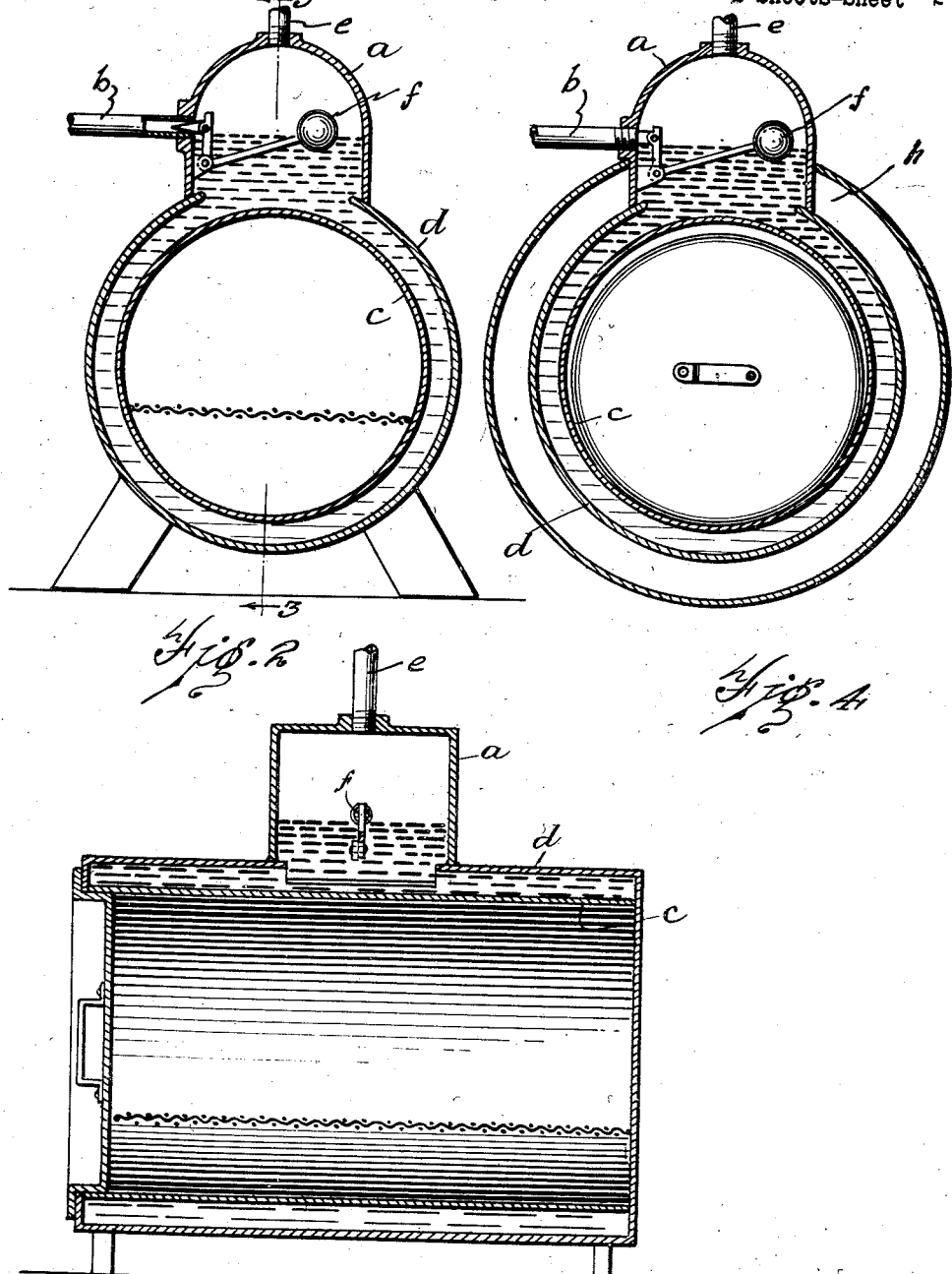

Patented May 15, 1928.

1,669,918

UNITED STATES PATENT OFFICE.

HOWARD STREETER, OF DETROIT, MICHIGAN.

EVAPORATING UNIT FOR REFRIGERATING SYSTEMS.

Application filed August 21, 1924. Serial No. 733,267.

This invention relates to heat exchange and has for its object a refrigerating unit for incorporation in a refrigerating cabinet. In mechanical refrigeration, it is customary to abstract heat from a refrigerator by the heat utilized in causing evaporation. The two most common types of devices for accomplishing this are the so-called expansion valve and the evaporating or boiling chamber. In the former, commonly called the direct expansion type, it is customary to allow a given amount of volatile liquid to escape into an expansion coil or chamber, in which the contents had been partially evacuated by the compressor. This causes a large portion of the volatile liquid to immediately assume a gaseous stage and in doing so it takes up the necessary heat to give the refrigerating effect. In the other type of refrigerating device, it is customary to provide a chamber in which a given level of a volatile liquid is maintained by a float valve. Very often coils or pipes are connected with this chamber to bring the liquid into more immediate contact with the air or brine of the refrigerator. When the compressor is in operation a partial vacuum is created above the level of the liquid in the float chamber and this liquid abstracting heat from the surrounding atmosphere or brine causes the liquid to boil up and a rapid evaporation takes place, thereby securing the refrigerating effect.

As stated, a refrigerating unit of the latter type very often has a large number of loops connected with a drum for the purpose of permitting the atmosphere or brine of the refrigerator box to circulate around the loops and come into close proximity with small quantities of the liquid for the purpose of facilitating the heat exchange.

However, an apparatus of the latter type is relatively expensive to construct, as it requires a large number of separately welded joints for the pipe loops and is more liable to get out of repair and spring a leak than the construction that I am about to describe. Furthermore, my improved refrigerating unit provides a chamber which may be used as a freezing chamber for an ice cream can, trays of water for making ice, etc. This will be more fully explained hereinafter.

In the drawings:

Fig. 2 is a cross section of the unit.

Fig. 3 is a longitudinal section on the line 3—3 of Fig. 2.

Fig. 4 is a view of a modified form of refrigerating unit used for freezing ice cream, ices, etc.

Figure 1:
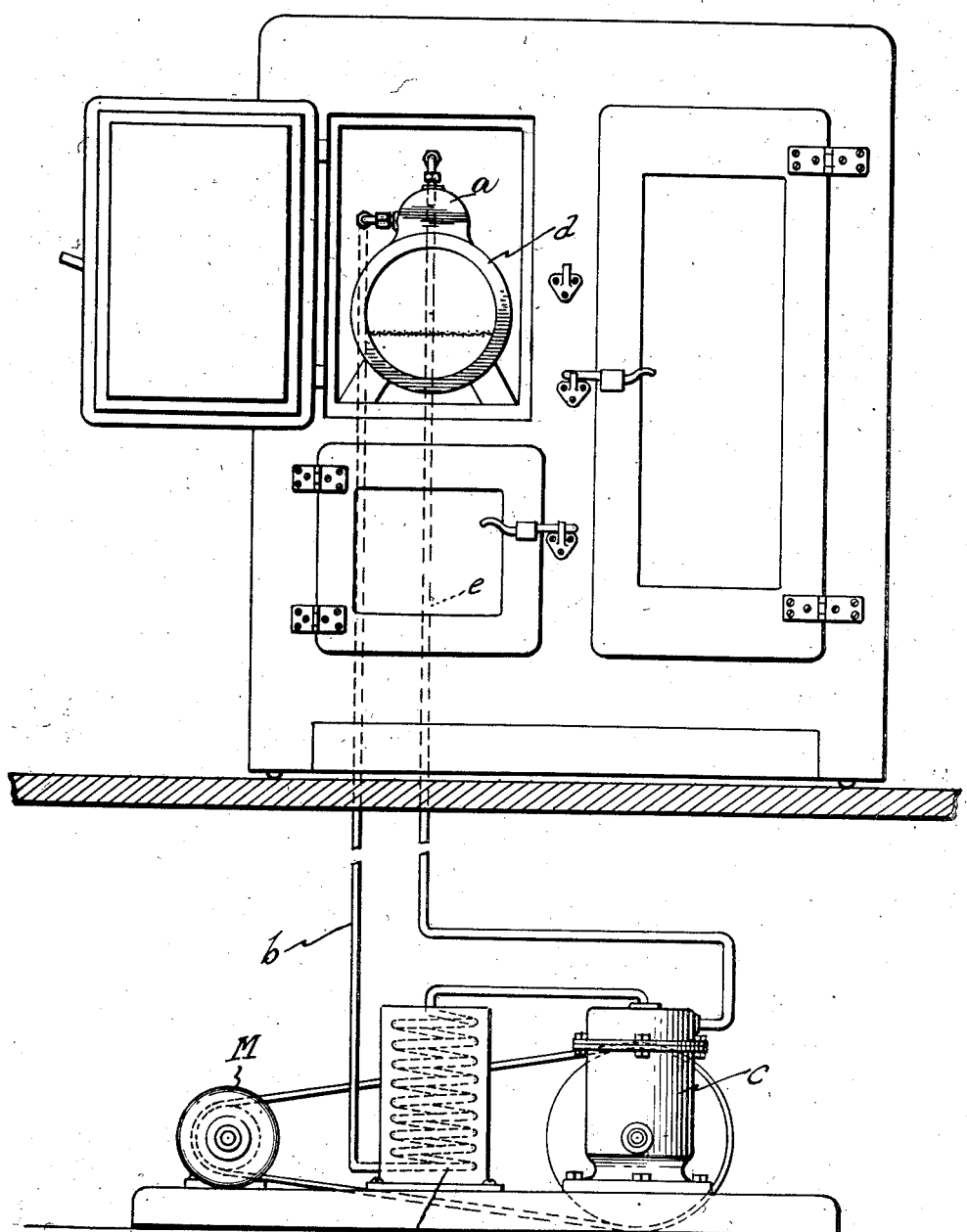
Fig. 1 shows a refrigerator in which my improved refrigerating unit is employed.

The apparatus comprises a float chamber or shell $a$, which is preferably in the form of a dome surmounted on a pair of concentric cylinders $d$ and $c$, the dome being welded, brazed or otherwise secured to the outer cylinder over a large opening in the outer cylinder. The space between the two cylinders is closed at both ends to form a relatively long annular chamber, for containing and spreading the liquid. This gives a relatively large surface area for the volatile liquid to bring it into contact with the contents of the refrigerating box for the purpose of heat exchange. This refrigerating unit may be submerged in a brine chamber or may be directly exposed to the atmosphere of the interior of the refrigerator.

Obviously, when the electric motor M is started in obedience to the usual thermostatic action, the compressor C is caused to draw the gases from off the top of the float chamber dome through the pipe $e$. This starts a partial vacuum in the dome and thereby stimulates a rapid evaporation, the liquid abstracting heat by contact with the brine or the atmosphere with the walls of the concentric cylinders.

This causes gas to form in the liquid, which gas rises to the surface of the liquid in the float chamber, where it escapes and is drawn down the pipe $e$ into the compressor. As the liquid is changed into a gas, more liquid is admitted by the opening of the float valve $f$, and so the action goes on.

The vapor drawn into the compressor is compressed to a high pressure and then passes into the condensing coils $g$. Here it can be subjected to cold air or cold water and this, together with the pressure with which the gas is confined, causes the same to liquefy. It passes up through the pipe $b$ and is again ready to flow into the float chamber when the float valve opens.

This forms an evaporating unit of the boiling type which is relatively cheap to manufacture, yet very effective in operation and not easy to get out of repair.

In Fig. 4, a modified form of construction is shown, wherein the unit is encased in a vacuum jacket $h$ and an ice cream can is inserted in the center of the concentric cylinders for freezing ice cream, ices, etc.

What I claim is:

1. An evaporating or heat exchange unit, comprising a shell forming the sides and top of a liquid and gas chamber, and a liquid distributing and spreading chamber for heat exchange purposes, comprising a pair of concentric shells directly connected to said first named shell having the space between the shells closed at the ends and in communication with the fluid in the first mentioned shell.

2. An evaporating or heat exchange unit, comprising a shell forming the sides and top of a liquid and gas chamber with a float control valve and a liquid containing and spreading chamber for heat exchange purposes, comprising a pair of concentric cylinders directly connected to said first named shell having the space between the cylinders closed at the ends for containing liquid and in open communication with the liquid in the first mentioned shell.

3. An evaporating or heat exchange unit, comprising a shell forming the sides and top of a liquid and gas containing chamber, and a pair of concentric shells, the outer one being open at the top and welded to the first mentioned shell around said opening, the space between the two shells being closed at the ends to form a liquid containing and spreading chamber for heat exchange purposes, in open communication with the liquid in the first mentioned shell.

4. An evaporating or heat exchange unit, comprising a pair of concentric shells, the space between the shells being closed at the ends and forming a liquid containing and spreading chamber for heat exchange purposes, the outer cylinder being open at the top, and a dome secured to the outer shell around said opening to form a liquid and gas containing chamber.

5. An evaporating or heat exchange unit, comprising a pair of concentric cylinders, the space between the cylinders being closed at the ends to form a liquid containing and spreading chamber for heat exchange purposes, the outer cylinder being open at the top, the inner cylinder being provided with means for supporting an article or articles to be frozen, a shell secured to the outer cylinder around the opening therein for forming a gas and liquid containing chamber, and means for controlling the level of the liquid in the last chamber.

6. An evaporating unit for refrigerating systems of the flooded type, comprising a main header for receiving the liquefied refrigerant, a float valve within the header for controlling the height of the liquid within the header, and a pair of shells extending downwardly from said header to form an annular passageway for the liquid within the said header, said passageway formed by said shells extending downwardly and outwardly in a relatively large annular path so as to form a chamber beneath the header and within the shells.

In testimony whereof I have affixed my signature.

HOWARD STREETER.